United States Patent
Ariyoshi

[11] Patent Number: 5,250,017
[45] Date of Patent: Oct. 5, 1993

[54] AUTOMATIC TOOL CHANGER FOR A MACHINING APPARATUS

[75] Inventor: Kiyoko Ariyoshi, Yamaguchi, Japan

[73] Assignees: Kabushikikaisha Otec; Kabushikikaisha Ariyoshi Kikoshudan, Japan

[21] Appl. No.: 796,001

[22] Filed: Nov. 22, 1991

[30] Foreign Application Priority Data

Nov. 30, 1990 [JP] Japan .................. 2-336829

[51] Int. Cl.⁵ .................. B23Q 3/155; B23Q 3/157
[52] U.S. Cl. .................. 483/18; 483/19; 483/31; 483/51; 483/68
[58] Field of Search .................. 29/568; 483/18, 19, 483/31, 32, 51, 53, 68

[56] References Cited

U.S. PATENT DOCUMENTS

| | | | |
|---|---|---|---|
| 3,327,386 | 6/1967 | Jerue | 29/568 |
| 3,726,001 | 4/1973 | Anderson et al. | 29/568 |
| 3,821,844 | 7/1974 | Harman et al. | 483/18 X |
| 3,867,756 | 2/1975 | Koch et al. | 29/568 |
| 4,359,814 | 11/1982 | Pihery et al. | 483/31 |

Primary Examiner—Z. R. Bilinsky
Attorney, Agent, or Firm—Jones, Tullar & Cooper

[57] ABSTRACT

The disclosure relates to an improved automatic tool changer for use in a machining apparatus. The automatic tool changer is designed to cooperate with adapters each carrying a tool to be changed. The automatic tool changer comprises a bifurcated carrier plate and structure to traverse the carrier plate between a tool storage and the spindle of the machining apparatus. The upper tool-feeding arm of the carrier plate has two support rods extending therefrom and structure to detachably hold an adapter on the vertical support rods, and the lower tool-withdrawing arm of the carrier plate has two vertical support rods extending therefrom.

5 Claims, 5 Drawing Sheets

AUTOMATIC TOOL CHANGER FOR A MACHINING APPARATUS

BACKGROUND OF THE INVENTION

1. Field of the Invention

The present invention relates generally to an automatic tool changer which is designed to permit the automatic changing of different tools for the spindle of a machining apparatus.

2. Description of the Prior Art

FIG. 6 shows a representative example of attaching a tool to the spindle of a machining apparatus. Specifically, workspindle 1 has a conical hollow chamber 71 whereas cutting tool assembly E has a conical projection 72. Conical projection 72 has a grooved end 73. It is inserted in conical hollow chamber 71 of workspindle 1, and its grooved end 73 is pulled and caught by a collet ( not shown ). Cutting tool 74 can be brought to a desired radial position by driving an adjusting screw 75.

FIG. 7 shows a conventional automatic tool changer to be used with a machining apparatus whose spindle is designed to have a tool attached thereto as shown in FIG. 6. Specifically, the automatic tool changer includes a tool retainer-and-feeder 82, which comprises a tool retainer 85 in the form of a conveyor having a plurality of holes 81 to hold different tools E. Tool retainer-and-feeder 82 is placed adjacent to the spindle 1 of a machining apparatus, which spindle 1 is adapted to be raised or lowered as indicated by the double headed arrow. A transporting arm ( not shown ) is provided to transport tools from spindle 1 to tool retainer-and-feeder 82 and vice versa. In attaching tool E to spindle 1 of the machining apparatus the transporting arm is used to: grip and pull up tool E; carry tool E towards spindle 1; turn and put tool E into a horizontal position; and insert its conical end 72 into cylindrical hollow chamber 71 of spindle 1. Tool E is fixed to spindle 1 by an associated collet ( not shown ), and spindle 1 is lowered to put tool E in the correct position relative to a given work. In attaching another tool to spindle 1 in place of the used one the transporting arm works in the reversed way, thus carrying and putting tool E in a selected hole 81 in the conveyor 85. Then, the transporting arm picks up another tool to attach it to spindle 1 in the same way as described earlier.

As seen from FIG. 7, every tool is put in a selected hole 81 with its cylindrical end 72 inserted in the hole, and with its flange 86 engages caught by the circumference of the hole.

As described above, the changing of tools requires a series of actions, that is, tool's rising, traversing, turning to the horizontal position and fitting-in. Disadvantageously, this makes the tool changing mechanism complicated and bulky.

The transporting arm must follow one and the same path both in removing a used tool from the spindle and in attaching a new tool to the spindle. This prevents the sequential actions for attaching a new tool to the spindle of a machining apparatus from starting before having completed the sequential actions for removing the used tool from the spindle of the machining apparatus. Disadvantageously, this requires an extended time involved for changing tools.

SUMMARY OF THE INVENTION

In view of the above one object of the present invention is to provide an automatic tool changer which allows tools to follow different paths of simple linearity in attaching a new tool to the spindle of a machining apparatus and removing a used tool therefrom, thereby attaining smooth and quick change of tools.

To attain this object according to the present invention an automatic tool changer for use in a machining apparatus is designed to cooperate with adapters each having means to hold a tool to be changed on its front side, and two longitudinal guide through holes made in its body, and such tool changer is designed to comprise: a bifurcated carrier plate, the upper tool-feeding arm of which has two vertical support rods suspended therefrom and adapter holding means to detachably hold an adapter on the said vertical support rods, and the lower tool-withdrawing arm of which has two vertical support rods extending therefrom; and means to traverse the carrier plate between a tool storage and the spindle of the machining apparatus.

In attaching a tool to the spindle of a machining apparatus, an adapter having a tool on its front is raised to permit the two vertical support rods suspended from the tool-feeding arm to pass through the two longitudinal guide through holes of the adapter, and then, the adapter-and-tool combination is held on the support rods with the aid of the adapter holding means to prevent it from falling by gravity. The carrier plate is moved forward to bring its upper tool-feeding arm to the spindle of the machining apparatus, and then, the adapter holding means is actuated to release the adapter-and-tool combination, thus allowing it to descend along the suspending support rods of the upper tool-feeding arm to the tool mount of the spindle of the machining apparatus. Finally, the carrier is moved backward to bring its tool-feeding arm to a place where the tool-feeding arm causes no hindrance to the machining work.

In removing the tool after finishing the machining work, the carrier plate is moved forward to bring its lower tool-withdrawing arm to a position below the spindle of the machining apparatus, and the adapter having the tool attached to its front is disconnected from the spindle of the machining apparatus, thus allowing the adapter-and-tool combination to fall by gravity or to be pushed down with the aid of appropriate pusher means, and permitting the vertical support rods of the tool-withdrawing arm to pass through the guide through holes of the adapter. Then, the carrier is moved backward to bring its tool-withdrawing arm to the tool storage.

The support rods of the tool-feeding and tool-withdrawing arms of the carrier plate will be brought in exact registration with the guide through holes of an adapter, and therefore, the transportation of an adapter-and-tool combination from the tool storage to the tool-feeding arm and from the spindle of the machining apparatus to the tool-withdrawing arm can be effected smoothly. Advantageously the tool-feeding and tool-withdrawing arms are limited to the linear movement ( moving back and forth), and no rotation or turning of these arms is necessitated.

Still advantageously, simultaneous tool removal and attachment may be effected according to the "first-in, first-out" principle by: disconnecting an adapter bearing a used tool from the spindle of the machining apparatus;

and pushing down the adapter-and-used tool combination by a subsequent adapter bearing a new tool until the antecedent adapter-and-used tool combination has been held on the tool withdrawing arm, and then, the subsequent adapter-and-new tool combination has been reached at and been attached to the spindle of the machining apparatus.

BRIEF DESCRIPTION OF THE DRAWINGS

Other objects and advantages of the present invention will be understood from the following description of an automatic tool exchanger according to one embodiment of the present invention, which is shown along with an associated adapter in the accompanying drawings.

DESCRIPTION OF PREFERRED EMBODIMENTS

Before describing an automatic tool changer according to the present invention, a tool attachment unit for attaching a selected tool to the spindle end of a machining apparatus will be described.

Figure 5:
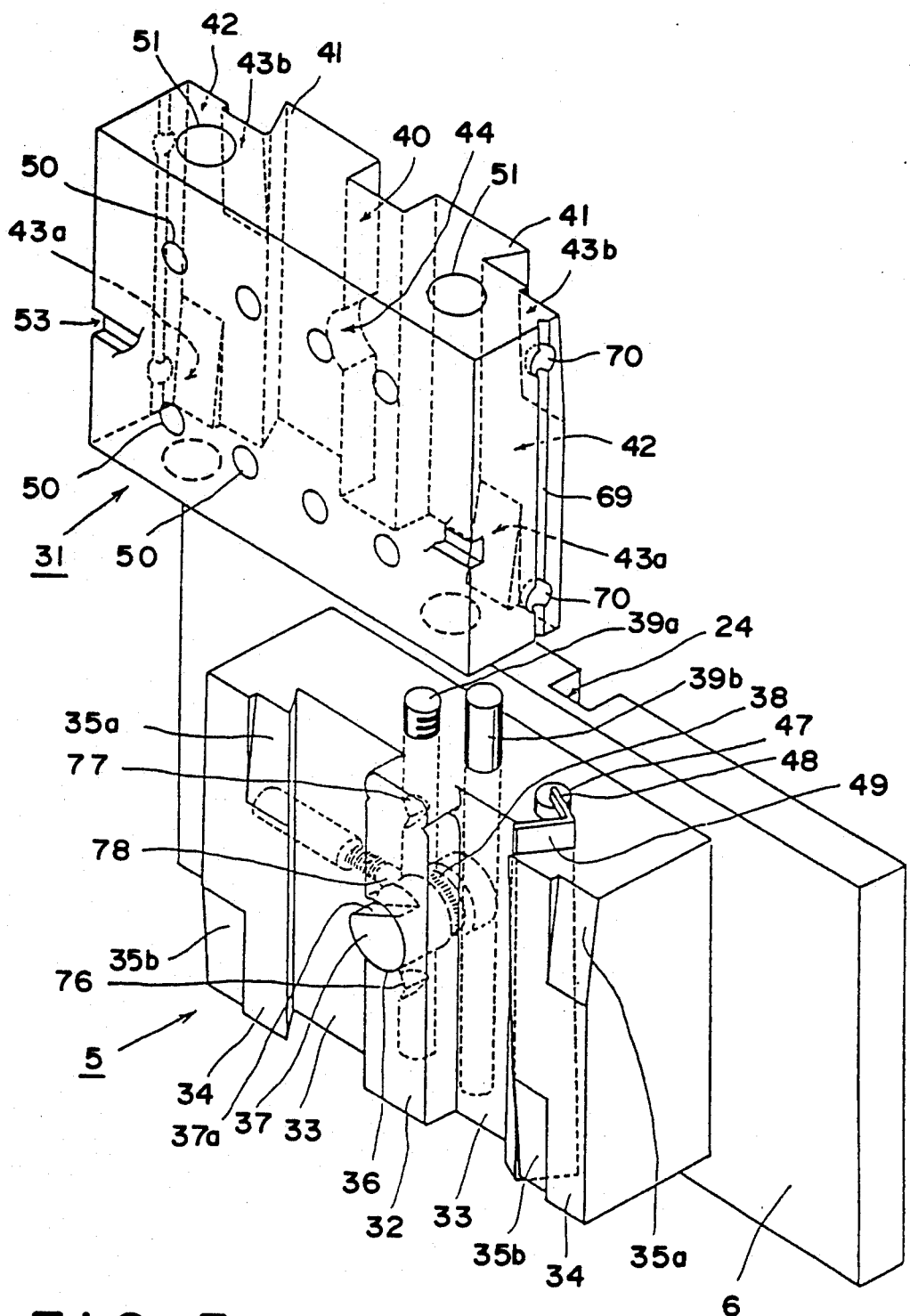
FIG. 5 is a perspective view of an adapter and an associated mount on the spindle end of the machining apparatus.
Figure 6:
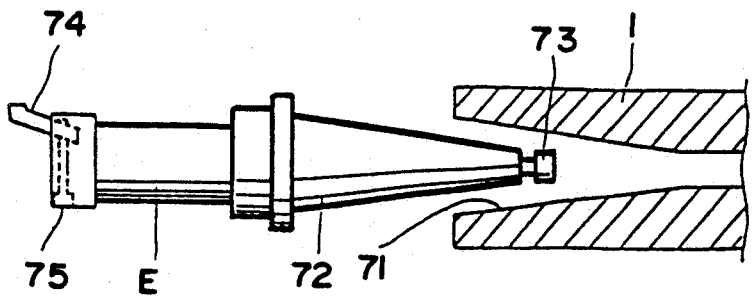
FIG. 6 shows schematically a conventional contact type tool attachment unit.
Figure 7:
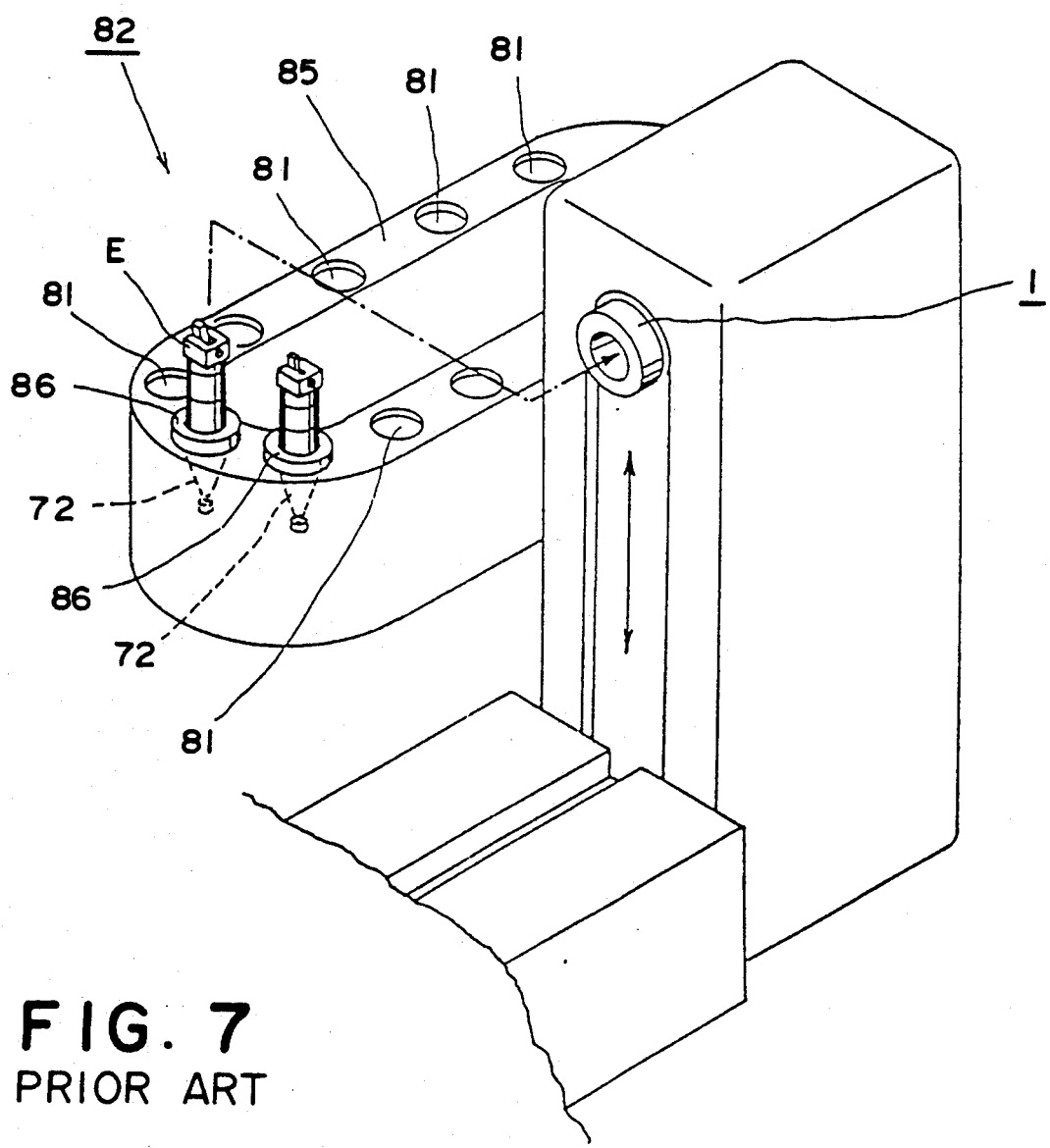
FIG. 7 is a perspective view of a conventional automatic tool changer.

FIG. 5 shows schematically such a tool attachment unit. Specifically, it mainly comprises a tool holder cubic 5 and an adapter 31 to be mated with the tool holder cubic 5. The tool holder cubic 5 is integrally connected to a flat slide 6, and can be driven to traverse the spindle of a machining apparatus along one of its end.

The front of the tool holder cubic 5 has a center guide projection 32 and opposite side guide projections 34. Parallel dovetail-like slots 33 are defined between the center and side guide projections 32 and 34. The top surface of each side guide projection 34 has two slant sections 35a and 35b at its diagonally opposite corners, thus leaving a staggered-rectangular section on its top surface.

Center guide projection 32 has a notched cylindrical rod 37 rotatably fitted in hole 36. Notched cylindrical rod 37 has a vertical flat plane 37a and a toothed circumference 38 in the form of a pinion. This pinion 38 is mated with parallel racks 39a and 39b, which are slidably fitted in through holes made in the tool holder cubic 5. Rack 39a has two notches 76 and 77 made thereon, and these notches 76 and 77 are adapted to accept a spring-biased catch bolt 78 when rack 39a is lowered or raised to predetermined vertical positions in which notched cylindrical rod 37 is rotated to have its vertical flat plane 37a flush with the side of center guide projection 32 or its round circumference projecting from the side of center guide projection 32.

Steel wedge 49 whose width diverges somewhat downward is inserted in slot 33 until its "L"-shaped top 48 is caught by push rod 47, which is resiliently urged upward to appear from the top of the tool holder cubic 5.

As for adapter 31 to be attached to the tool holder cubic 5 it has a center slot 40 to accept center guide projection 32 of tool holder cubic 5, "V"-shaped or dovetail-like projections 41 adapted to fit in parallel slots 33 of tool holder cubic 5 and two staggered-rectangular sections 42 adapted to fit on the corresponding staggered-rectangular sections of opposite side guide projection 34 of tool holder cubic 5. Each staggered-rectangular section 42 has slant sections 43a and 43b at its diagonally opposite corners. Semicircular recess 44 is made in left "V"-shaped projection 41 to allow notched cylindrical rod 37 to enter when it turns. Adapter 31 has two longitudinal through holes 51, and the front of adapter 31 has a plurality of holes 50 to receive the studs of an associated cutting tool and two lateral slots 53 to orient the cutting tool in a prescribed direction. The cutting tool has two counter projections ( not shown ) on its bottom to fit in lateral slots 53. Also, adapter 31 has a longitudinal groove 69 and two holes 70 on either side.

Next, an automatic tool changer according to the present invention is described with reference to FIGS. 1 to 3.

Figure 1:
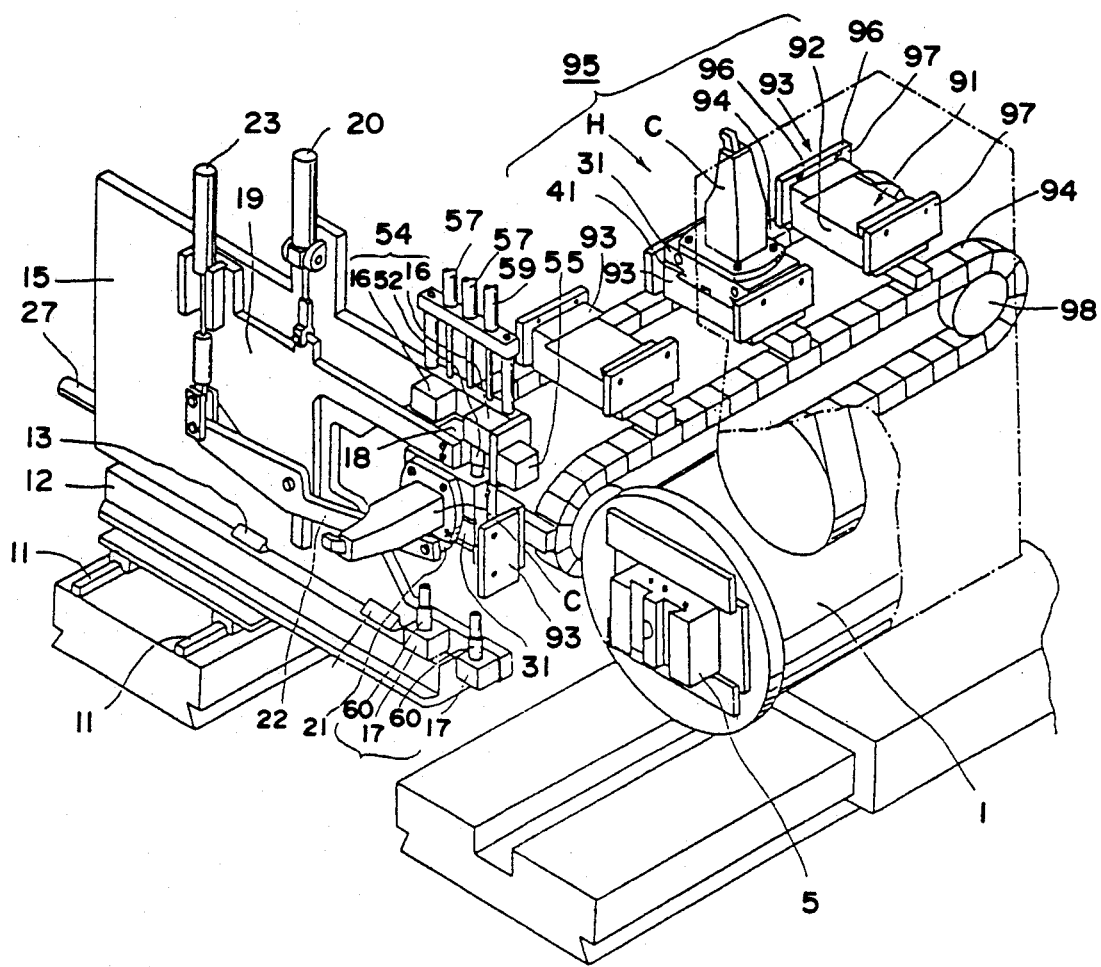
FIG. 1 is a perspective view of an automatic tool changer according to one embodiment of the present invention.

As seen from FIG. 1, lateral slide 12 can slide on parallel longitudinal rails 11,11. Detent pieces 13,13 and support rods ( not shown ) are provided on lateral slide 12 in such a position that carrier plate 15 may be held on slide 12.

Carrier plate 15 is designed so as to carry an adapter 31 with a tool bolted thereto to the tool holder cubic 5. For this purpose the carrier plate 15 is bifurcation. The upper branch of the bifurcation has metal mounts 16,16 extending forward from its front surface. Each metal mount 16 has a support rod 52 extending downward from its bottom. The upper branch of the bifurcation, the two metal mounts 16 and associated support rods 52 together constitute a feeding arm 54.

The lower branch of the bifurcation has metal mounts 17,17 extending forward from its front. Each metal mount 17 has a support rod 60 extending upward from its top. The lower branch of the bifurcation, the two metal mounts 17 and associated support rods 60 together constitute a withdrawal arm 61.

Figures 2, 3:
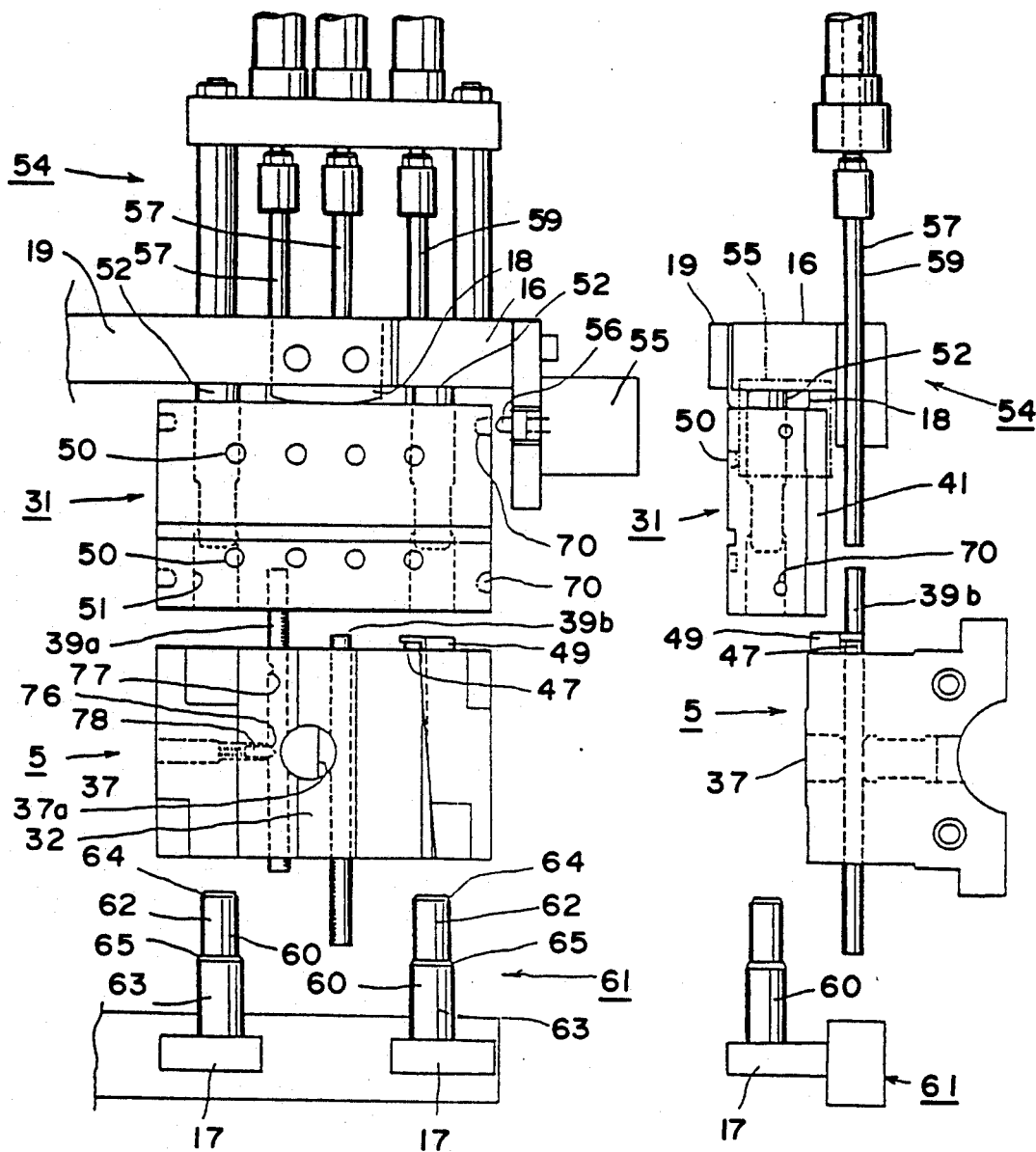
FIG. 2 is a front view of an adapter and an associated mount in the position in which these parts are about to be mated.
FIG. 3 is a side view of the parts appearing in FIG. 2.

As shown in FIGS. 2 and 3, feeding arm 54 has an electromagnet 55 fixed to the right end of the upper branch for preventing adapter 31 from descending along support rods 52, 52 with the aid of its movable projection 56, three hydraulic cylinders 57, 57, and 59 fixed to the upper lateral branch of the driving racks 39a and 39b and for pushing wedge 49 of the tool holder cubic 5, respectively.

Support rods 52 and 60 have a similar configuration. Support rod 60 has a trunk portion 63 of relatively large diameter and a head portion 62 of relatively small diameter. Head portion 62 has a chamferred circumference 64 on its top, and an upward-converging truncated circumference 65 provided between the trunk portion 63 and the head portion 62. Likewise, each through hole 51 of adapter 31 has a corresponding hollow shape. Specifically, it comprises upper and lower hollow entrances of relatively large diameter and an intermediate hollow space of relatively small diameter. These sections of different diameters communicate with each other via inward converging or outward diverging transient sections This assures that support rods 52 and 60 are smoothly inserted in corresponding throughholes 51 all the way from the entrance to the final position without any interference which might cause deformation in the support rods 52 and 60 or throughholes 51.

As seen from FIG. 1, vertically movable fork carrier 19 has a rear projection 18 on its upper branch end to be inserted between metal mounts 16 and 16. Fork carrier 19 is suspended from hydraulic cylinder 20 of the carrier plate 15, therby permitting the lifting and lowering of the fork carrier 19 in the front surface of the carrier plate 15.

Vertically movable fork carrier 19 has a carrier arm 22 pivotted thereto at its center. One end of the carrier arm 22 has a cylindrical projection 21 to be inserted in between metal mounts 17 and 17, and the other end of the carrier arm 22 is connected to the hydraulic cylinder 23, which is fixed to the fork carrier 19.

Carrier plate 15 is adapted to move back and forth on lateral slide 12 by a rack-and-gear mechanism (not shown), which can be driven by hydrulic cylinder 27.

Likewise, lateral slide 12 is adapted to move back and forth on parallel longitudinal rails 11 and 11 by a hydrulic cylinder (not shown), which is connected to the rear side of the lateral slide 12.

A plurality of tool retainers 93 to hold tools for use may be stored in a tool retainer magazine 95.

As seen from FIG. 1, the tool retainer 93 comprises a plastic mold body 92, which has a somewhat divergent slot 91 formed in its front surface, and opposite side walls 97 integrally connected to the opposite sides of the plastic mold body 92 and extending forward. The somewhat divergent slot 91 of the plastic mold body 92 has the size and shape to allow the V-shaped projections 41 of the rear side of the adapter 31 to slidably fit therein. Each side wall has upper and lower yieldingly depressable projections 96 on its inner surface. Each projection 96 has a chamfered top to provide a guide circumferential slope.

Tool retainer magazine 95 comprises parallel endless chains 94 and 94 having means to hold a plurality of tool retainers 93 at regular intervals, sprocket wheels 98 to drive the endless chains 94 and 94, and an associated power drive (not shown). Also, it has projectable means (not shown) to push the rear side of each tool retainer 93. As seen from FIG. 1, tool retainer magazine 95 is placed adjacent to spindle 1 of a machining apparatus so that the front of the leading tool retainer 93 may be put in coplanar relation with tool holder cubic 5.

The manner in which adapter 31 with tool C attached thereto by bolts is mated with tool holder cubic 5 is described below.

First, tool C is attached to the front of adapter 31 by bolts, and adapter 31 carrying tool C is mated with tool retainer 93 selected among those on endless chain conveyor 94, 94 by slidably fitting the rear projections 41 of adapter 31 in the counter slot 91 of the tool retainer 93. When the rear projections 41 of the adapter 31 are made to advance downward in the counter slot 91 of the tool retainer 93, upper and lower depressable projections 96 yieldingly withdraw, thereby allowing adapter 31 to advance until upper and lower depressable projections 96 are permitted to project into counter holes 70 and 70 formed on the opposite sides of the adapter 31, thus holding and preventing adapter 31 from slipping and falling down from tool retainer 93 by gravity.

Next, endless chains 94 and 94 are driven to bring the tool retainer 93 to the front position of the tool retainer magazine 95, and then a projectable means (not shown) is actuated to push the rear side of the tool retainer 93, thereby temporarily preventing advance of the chain conveyor.

Thereafter, carrier arm 22 is actuated by hydraulic cylinder 23 to raise and remove adapter 31 from the tool retainer 93, and continue to raise adapter 31 with support rods 52 and 52 slidably inserted in through holes 51 and 51 of adapter 31. Then, elctromagnet 55 is actuated to project its movable projection 56, thereby abutting against adapter 31 to prevent adapter 31 from descending along the support rods 52 and 52 by gravity.

Lateral slide 12 is moved forward on rails 11 and 11 by actuating a hydraulic cylinder (not shown which is provided behind slide 12.

Thereafter, carrier plate 15 is moved rightward in FIG. 1 to put adapter 31 above tool holder cubic 5. As seen from FIGS. 2 and 3, hydraulic cylinder 59 is actuated to push down L-shaped end 48 of wedge 49, thereby loosening wedge 49. At the same time hydraulic cylinder 57 is actuated to push down rack 39a, thereby rotating notched cylindrical rod 37 until its vertical flat plane 37a is flush with the side of center guide projection 32. Then, spring-biased catch bolt 78 is allowed to advance and fit in notch 77 on rack 39a, thus holding rack 39a in a first predetermined position in which notched cylindrical rod 37 is prevented from rotating, and is kept with its vertical flat plane 37a flush with the side of the center guide projection 32. The other rack 39b rises as a counter action to the pushing-down of rack 39a, as seen from FIG. 5.

Referring to FIGS. 1 and 2, electromagnetic unit 55 is actuated to withdraw its projection 56, thereby setting adapter 31 free from feeding arm 54. Then, hydraulic cylinder 23 is actuated to rotate carrier arm 22 about its pivot until adapter 31 is gripped between carrier arm 22 and the upper branch of fork carrier 19, and hydraulic cylinder 20 is actuated to lower fork carrier 19 so that adapter 31 carrying tool C is released from feeding arm 54, allowing rear projection 41 of adapter 31 to slidably fit in opposite slots 33 and 33 of the tool holder cubic 5. Then, movement of the adapter 31 is limited by opposite support rods 52 in the lateral direction and by the upper branch of carrier plate 19 and carrier arm 22 in vertical direction. Therefore, the descending-and-fitting of the adapter 31 in the tool holder cubic 5 can be controlled with high precision. As seen from FIG. 5, when adapter 31 starts descending on tool holder cubic 5, each slant section 43a of the adapter 31 rides on the staggered-rectangular surface 34 of each side wall of the tool holder cubic 5 to assist adapter 31 in aligning with the tool holder cubic 5 so that the "V"-shaped projections 41 may be fitted smoothly in parallel slots 33 of the tool holder cubic 5.

Then, right hydraulic cylinder 57 is actuated to push rack 39b down, thereby rotating pinion 38 until notched cylindrical rod 37 is fitted in the semicircular recess 44 of the "V"-shaped projection 41, thereby permitting the adapter 31 to be mated with the tool holder cubic 5. At the same time, rack 39a is raised until the spring-biased catch bolt 78 is allowed to advance and fit in notch 76, thereby keeping rack 39a at the second predetermined position, preventing notched cylindrical rod 37 from turning. Finally, the hydraulic cylinder 59 is released to remove pressure from wedge 49, thereby allowing it to resiliently rise from depression under the influence of spring means (not shown), thus integrally connecting adapter-and-tool to tool holder cubic 5.

Thereafter, carrier plate 15 is withdrawn to a place where it causes no interference with the tool retainer magazine 95 and other asociated units. Thus, the tool attaching work is finished, and spindle 1 of the machining apparatus is ready for machining work.

Removal of tool C from spindle 1 is described as follows. Carrier plate 15 is made to advance until its upper and lower arms 54 and 61 come close to spindle 1, and then left hydraulic cylinder 57 is actuated to push down rack 39a, thereby rotating notched cylindrical rod 37 until its vertical flat plane 37a is flush with the side of center guide projection 32. At the same time, hydraulic cylinder 59 is actuated to depress wedge 49, thereby disconnecting adapter-and-tool from the tool holder cubic 5.

The upper branch of carrier plate 19 and the carrier arm 22 grip adapter 31, and descend together, thus allowing opposite support rods 60 and 60 of withdrawal arm 61 to be inserted in through holes 51 and 51 of adapter 31. Thereafter, the carrier plate 15 is shifted leftwards to bring adapter 31 to the tool retainer magazine 95.

The storing of adapters 31 in a tool retainer magazine 95 is described below.

Adapter 31 carrying tool C is gripped by the upper branch of the fork carrier 19 and the carrier arm 22 to be brought under tool retainer 93 in front of the tool retainer magazine 95, and then adapter 31 is raised with its rear projections 41 slidably fitted in slot 91 of the tool retainer 93 until depressible projections 96 of the tool retainer 93 are permitted to project in catch holes 70 of the opposite sides of adapter 31. Thus, adapter-and-tool are held in the tool retainer 93.

If it is desired that another tool D is to be attached to spindle 1, projectable means (not shown) are actuated to remove pressure from the rear side of the adapter 31 carrying tool C, and the sprockets 98 are rotated to bring a selected adapter carrying tool D to the front position of tool retainer magazine 95. The attaching operation as described earlier is repeated to attach tool D to spindle 1.

Figure 4:
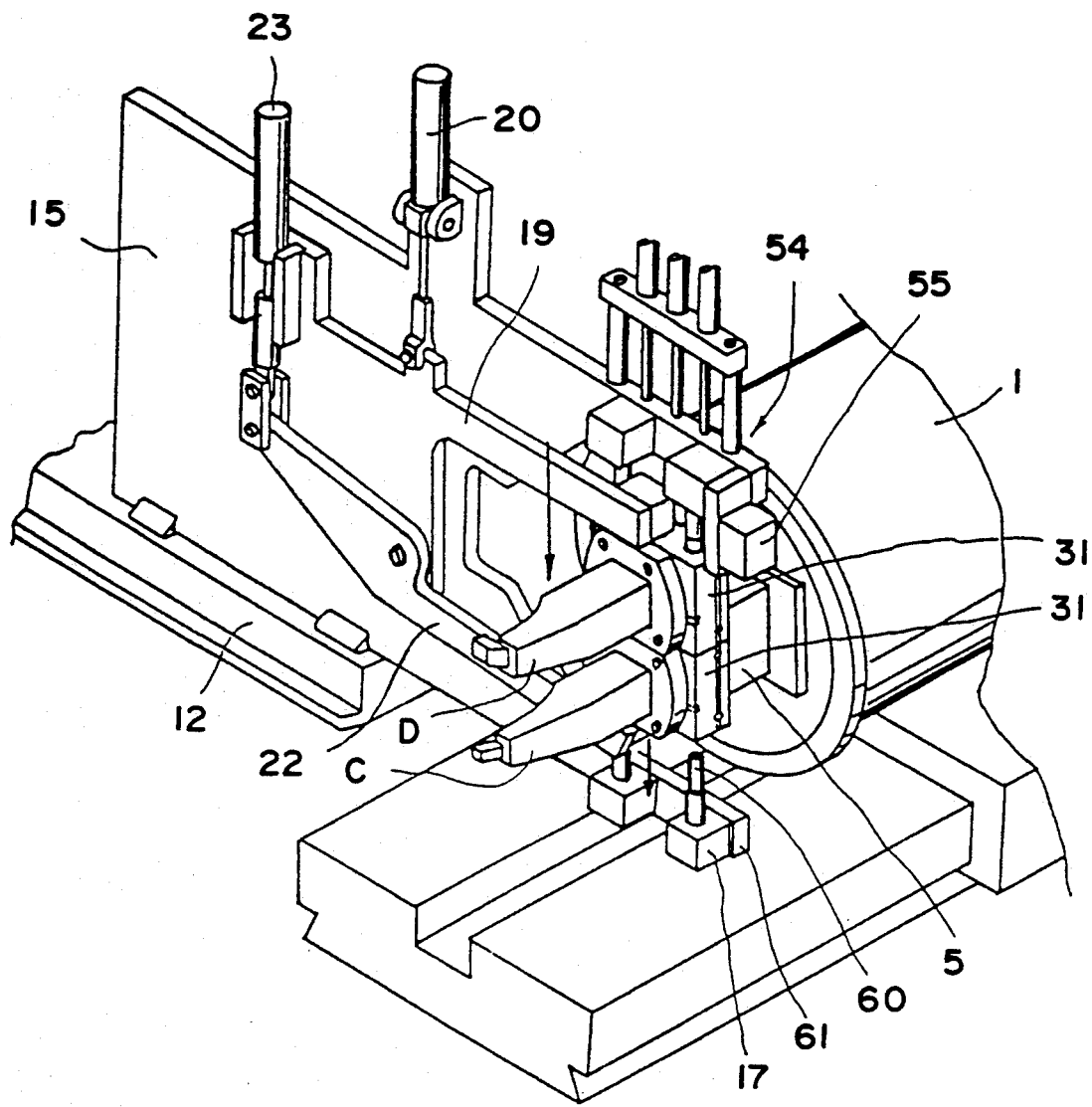
FIG. 4 shows the manner in which different tools are simultaneously removed and attached to the spindle of a machining apparatus according to the "first-in, first-out" principle.

In the case that the tool D is attached to the spindle 1 in sequence with removal of tool C, adapter 31 carrying tool C is disconnected from the tool holder cubic 5, and then adapter 31 carrying tool D is lowered to push the lower adapter 31 carrying tool C toward withdrawal arm 61, as shown in FIG. 4. This "first-in, first-out" tool displacement permits simultaneous proceeding of removal and attachment of different tools, thus substantially reducing the time involved for changing different tools.

In this particular embodiment tool-feeding arm 54 and tool-withdrawing arm 61 are designed to move back and forth, but these arms, in addition to their lateral movement, may be designed to rise and descend although the tool transporting mechanism will be somewhat complicated, and the accuracy with which tool transportation can be effected will be inevitably lowered a little.

As may be understood from the above, in an automatic tool changer according to the present invention its tool-feeding and tool-withdrawing arms move back and forth only. No rotational movement is required, and accordingly an automatic tool exchanger can be designed to be simple and small, and it can control transportation and change of tools with an improved accuracy. Also, in an automatic tool changer according to the present invention a tool-feeding path is different from a tool-withdrawing path, and therefore, attachment and detachment of tools can be effected simultaneously, permitting substantial reduction of the time involved for changing different tools.

What is claimed is:

1. An automatic tool changer for use in a machining apparatus having a rotatable spindle having a front end surface, to detachably hold a tool, comprising:
   a plurality of adapters each comprising a body with front and rear surfaces, means to hold a tool to be changed on the front surface, two parallel, longitudinal dovetail-like projections extending from its rear surface, and two longitudinal guide through holes in said body;
   a tool holder cubic fixed to a front end surface of the rotatable spindle, said tool holder cubic having two parallel, longitudinal dovetail-like slots to detachably and slidably mated with said dovetail-like projections of each adapter;
   a bifurcated carrier plate having an upper tool-feeding arm and a lower tool-withdrawing arm, each arm having support rods extending therefrom, holding means associated with the support rods extending from the upper tool-feeding arm to detachably hold an adapter, and sliding means associated with the support rods extending from the upper tool-feeding arm to cause an adapter to slide onto said tool holder cubic; and
   transport means including tool storage, operatively associated with said bifurcated carrier plate to transport a tool from the tool storage to said bifurcated carrier plate,
   wherein one tool is removed from said tool holder cubic simultaneously with another tool being mounted to said tool holder cubic by said bifurcated carrier plate.

2. The automatic tool changer as defined in claim 1, wherein said tool holder cubic further has means for adjusting the position of an adapter to said tool holder cubic.

3. The automatic tool changer as defined in claim 2, wherein said adjusting means includes a notched cylindrical rod defining a pinion, and adjacent rods defining racks, and a spring-biased catch bolt which engages either of two spaced apart notches formed in one of said adjacent rods.

4. The automatic tool changer as defined in claim 1, wherein said transport means includes a plurality of tool retailers for holding an adapter.

5. The automatic tool changer as defined in claim 4, further comprising:
   a fork carrier mounted to be vertically displaceable on said bifurcated carrier plate; and
   a carrier arm pivotably mounted to said fork carrier for engaging and removing an adapter from a tool retainer.

* * * * *